(12) United States Patent
Yomogida

(10) Patent No.: US 8,576,463 B2
(45) Date of Patent: Nov. 5, 2013

(54) AUTOMATIC DOCUMENT FEEDER AND IMAGE FORMING APPARATUS

(75) Inventor: Matsuo Yomogida, Miyagi (JP)

(73) Assignee: Ricoh Company, Limited, Tokyo (JP)

( * ) Notice: Subject to any disclaimer, the term of this patent is extended or adjusted under 35 U.S.C. 154(b) by 189 days.

(21) Appl. No.: 13/067,403

(22) Filed: May 31, 2011

(65) Prior Publication Data

US 2011/0292476 A1 Dec. 1, 2011

(30) Foreign Application Priority Data

Jun. 1, 2010 (JP) ................................. 2010-125768

(51) Int. Cl.
*H04N 1/04* (2006.01)

(52) U.S. Cl.
USPC ............ 358/498; 358/474; 358/496; 358/497

(58) Field of Classification Search
USPC .......................... 358/498, 474, 496, 497, 475
See application file for complete search history.

(56) References Cited

U.S. PATENT DOCUMENTS

| | | | |
|---|---|---|---|
| 5,761,567 A * | 6/1998 | Yoshizuka | 399/17 |
| 7,197,273 B2 | 3/2007 | Imai et al. | |
| 7,869,755 B2 | 1/2011 | Sano et al. | |
| 2010/0194024 A1 * | 8/2010 | Yahata | 270/58.17 |

FOREIGN PATENT DOCUMENTS

| | | |
|---|---|---|
| CN | 1583535 | 2/2005 |
| CN | 101063844 | 10/2007 |
| JP | 58-021576 A | 2/1983 |
| JP | 63-136431 A | 6/1988 |
| JP | 05-026725 A | 2/1993 |
| JP | 09-329848 A | 12/1997 |
| JP | 10-293366 A | 11/1998 |
| JP | 2002-251056 A | 9/2002 |
| JP | 3877699 B2 | 11/2004 |

OTHER PUBLICATIONS

Abstract of JP 2004-320574 published on Nov. 11, 2004.
Notification of First Office Action for corresponding Chinese patent application No. 201110152202.4 dated Jul. 26, 2012 (with English translation).

* cited by examiner

*Primary Examiner* — Houshang Safaipour
(74) *Attorney, Agent, or Firm* — Harness, Dickey & Pierce, P.L.C.

(57) ABSTRACT

An automatic document feeder includes an original feed table that has a detection hole and on which a bundle composed of a plurality of originals is set; and an original detection sensor that detects the original on the original feed table. The original detection sensor is a reflective optical sensor having a light-emitting unit and a light-receiving unit, and disposed under or inside of the original feed table to detect the original though the detection hole. The detection hole includes a light-emitting side portion corresponding to the light-emitting unit of and a light-receiving side portion corresponding to the light-receiving unit of the original detection sensor, the light-emitting side portion and the light-receiving side portion having planar shapes different from each other. The original feed table includes a light-shielding portion that is provided above the light-receiving unit of the original detection sensor, and has a slanted surface overhanging the light-receiving unit.

19 Claims, 21 Drawing Sheets

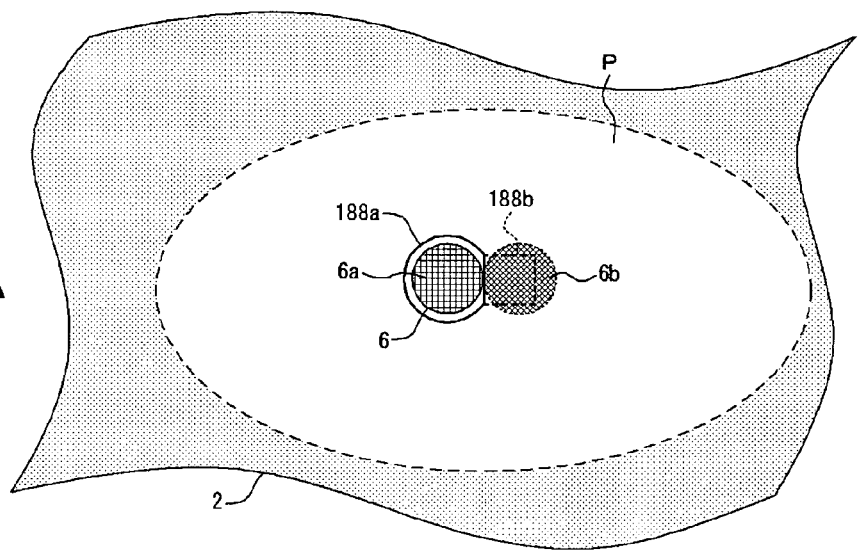
FIG.21A
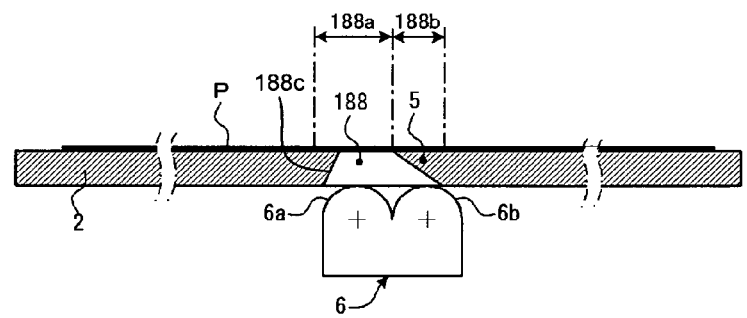
FIG.21B
FIG.22
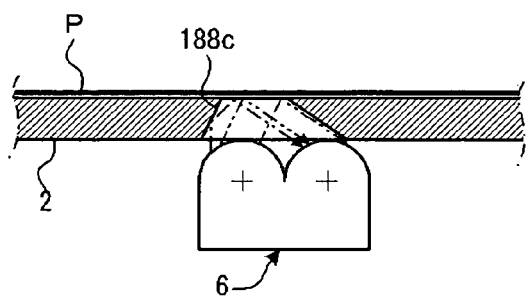

AUTOMATIC DOCUMENT FEEDER AND IMAGE FORMING APPARATUS

CROSS-REFERENCE TO RELATED APPLICATIONS

The present application claims priority to and incorporates by reference the entire contents of Japanese Patent Application No. 2010-125768 filed in Japan on Jun. 1, 2010.

BACKGROUND OF THE INVENTION

1. Field of the Invention

The present invention relates to an automatic document feeder that is mounted on an image scanning device and conveys an original.

2. Description of the Related Art

An image scanning device that scans an original image is well known and widely used as an image scanning unit included in a scanner or an image forming apparatus. An automatic document feeder (ADF) is also well known that is mounted on the image scanning device and conveys an original to a scanning position.

An image forming apparatus including an ADF is disclosed in, for example, Japanese Patent Application Laid-open No. 2002-251056, Japanese Patent No. 3877699, and Japanese Patent Application Laid-open No. H10-293366.

The automatic document feeder generally includes an original detection unit (original detection sensor) that detects an original set on an original feed table. A reflective optical sensor is widely used for the original detection unit. For example, Japanese Patent Application Laid-open No. H9-329848 discloses reflective optical sensors that each include a light-emitting element and a light-receiving element, and are used for original size detection sensors denoted by the reference numerals 21 to 24 included in an original detection unit 20 (in paragraph 0018 and FIG. 3).

The use of a reflective optical sensor that includes light-emitting and light-receiving units for an original detection unit and is provided to an original feed table of an automatic document feeder may cause erroneous detection due to disturbance light such as lighting directly entering the light-receiving unit of the sensor from above the automatic document feeder.

Techniques to prevent erroneous operation of such sensor are disclosed in Japanese Patent Application Laid-open No. 58-021576 and Japanese Patent Application Laid-open No. 63-136431, for example. These techniques, however, cannot effectively prevent original detection error due to disturbance light around an original feed table of an automatic document feeder.

Japanese Patent Application Laid-open No. H10-293366 discloses an original separating conveying device that includes a movable shielding member 22 to shield a sensor from disturbance light. The structure, however, inevitably increases costs due to complexity thereof and increasing the number of components'.

SUMMARY OF THE INVENTION

It is an object of the present invention to at least partially solve the problems in the conventional technology.

According to an aspect of the present invention, there is provided an automatic document feeder includes an original feed table that has a detection hole and on which a bundle composed of a plurality of originals is set, the originals being separated from the bundle one by one so as to be conveyed to a certain scanning position; and an original detection sensor that detects the original on the original feed table. The original detection sensor is a reflective optical sensor having a light-emitting unit and a light-receiving unit, and disposed under or inside of the original feed table so as to detect the original though the detection hole. The detection hole includes a light-emitting side portion corresponding to the light-emitting unit of and a light-receiving side portion corresponding to the light-receiving unit of the original detection sensor, the light-emitting side portion and the light-receiving side portion having planar shapes different from each other. The original feed table includes a light-shielding portion that is provided above the light-receiving unit of the original detection sensor, and has a slanted surface overhanging the light-receiving unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 21A and 21B are schematics illustrating an eighteenth embodiment of a disturbance light prevention structure for an original detection sensor;

FIG. 22 is a cross-sectional view illustrating a detection hole according to an eighteenth embodiment of the invention.

DETAILED DESCRIPTION OF THE PREFERRED EMBODIMENTS

Figure 1:
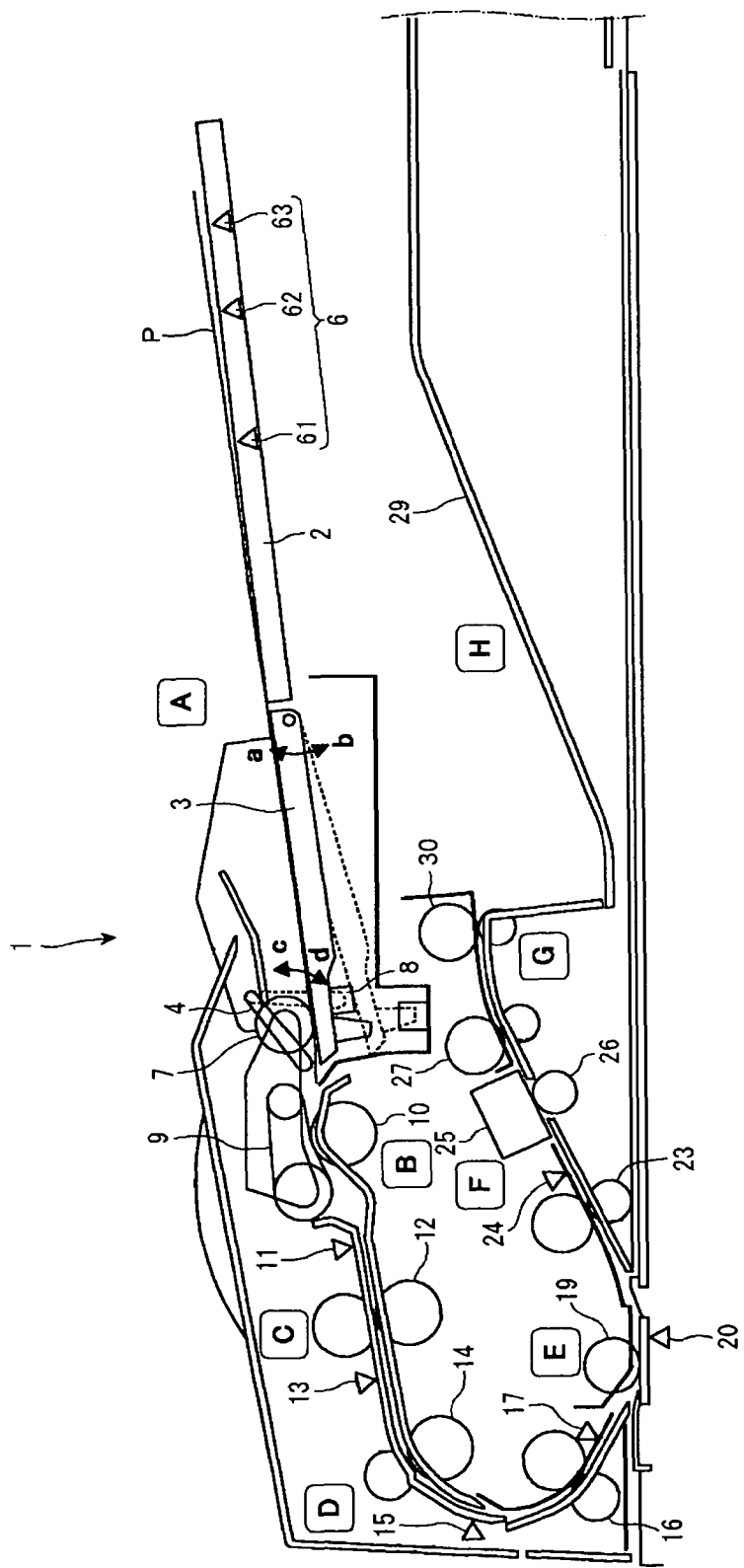
FIG. 1 is a cross-sectional view illustrating a structure of a sheet-through ADF that is an example of an automatic document feeder according to the present invention.

An embodiment of the present invention is described below with reference to the accompanying drawings. FIG. 1 is a cross-sectional view illustrating a structure of a sheet-through ADF that is an example of an automatic document feeder according to the present invention. A sheet-through ADF 1 of the embodiment includes an original setting unit A, a separation feed unit B, a registration unit C, a turning unit D, a first scanning conveying unit E, a second scanning conveying unit F, a discharging unit G, and a stacking unit H. In the original setting unit A, originals being scanned are set and stacked as a bundle. In the separation feed unit B, an original is separated sheet by sheet from the set originals and fed forward. In the registration unit C, the fed original is abutted so as to be aligned, and the original after alignment is pulled out so as to be conveyed forward. In the turning unit D, the conveyed original is turned and conveyed in such a manner that an original surface faces a scanning side (faces a downward direction). The first scanning conveying unit E scans a front surface image of the original from below a contact glass. The second scanning conveying unit F scans a back surface image of the original after the scanning in the first scanning conveying unit E. The discharging unit G discharges the original whose front and back surfaces have been scanned to an outside of the ADF 1. In the stacking unit H, originals that have been scanned are stacked and held.

An original bundle P is set on an original table 2 including a movable original table 3. In the embodiment, the original bundle P is set in such a manner that each original surface faces an upward direction. The original table 2 is provided with side guides (not illustrated) that position the original bundle P in a width direction thereof orthogonal to a conveying direction thereof. A set filler 4 and a set sensor 8 detect setting of an original. In addition, the original table 2 is provided with an original detection sensor 6 that detects an original set on the table (so as to determine an original size). In the embodiment, the original detection sensor 6 includes three sensors 61 to 63.

The movable original table 3 can be moved by a bottom plate lifting motor in up and down directions respectively illustrated as directions a and b in FIG. 1. Once the setting of the original bundle P is detected by the set filler 4 and the set sensor 8, the bottom plate lifting motor is rotated in a normal rotational direction so as to lift the movable original table 3 in such a manner that the uppermost surface of the original bundle P makes contact with a pickup roller 7.

A main control unit transmits an original feed signal, causing a feed motor to rotate in a normal rotational direction. The feed motor drives a roller of the pickup roller 7 so as to pick up several sheets (ideally one sheet) of the originals stacked on the original table 2. The roller is rotated in a rotational direction that causes the uppermost original to be conveyed to a paper feed port. A feed belt 9 is driven in a feed direction by the feed motor rotating in the normal rotational direction. A reverse roller 10 is rotationally driven in a direction opposite to the feed direction by the feed motor rotating in the normal rotational direction, resulting in the uppermost original being separated from underlying originals so as to be fed alone.

The original separated as a single sheet by the feed belt 9 and the reverse roller 10 is conveyed forward by the feed belt 9, so that the leading edge of the original is detected by an abutting sensor 11. The original is further conveyed forward and abutted to a pair of pullout rollers 12 rotation of which is halted. The original is further conveyed forward by a predetermined distance from a position at which the leading edge has been detected by the abutting sensor 11. As a result, the original abutted to the pullout rollers 12 is warped with a predetermined warp amount when the feed motor is stopped, and thus the feed belt 9 is stopped from being driven. The pullout rollers 12 have a skew correction function, and convey the original skew-corrected after the separation to a pair of intermediate rollers 14 by being driven by the feed motor rotating in a reverse rotational direction. At the time when the feed motor rotating in the reverse rotational direction, the pullout rollers 12 and the intermediate rollers 14 are driven while the pickup roller 7 and the feed belt 9 are not driven.

A plurality of original width sensors 13 are arranged along a direction orthogonal to the conveying direction of the original, and detect a size of the original conveyed by the pullout rollers 12 in a width direction orthogonal to the conveying direction of the original. On the other hand, the length of the original in the conveying direction is detected by counting motor pulses during a period of time from when the abutting sensor 11 reads the leading edge of the original to when the abutting sensor 11 reads the trailing edge of the original.

In conveying the original from the registration unit C to the turning unit D by the pullout rollers 12 and the intermediate rollers 14 that are rotated, a conveying speed in the registration unit C is set faster than a conveying speed in the first scanning conveying unit E so as to reduce time taken for sending the original to a scanning unit.

When the leading edge of the original is detected by a scanning entrance sensor 15, the original conveying speed begins to be reduced so as to be the same as a scanning conveying speed before the leading edge of the original enters a nip between a pair of scanning entrance rollers 16 provided in an up-down direction, and simultaneously a scanning motor is rotated in a normal rotational direction so as to drive the scanning entrance rollers 16, a pair of scanning exit rollers 23, and a pair of CIS exit rollers 27. When the leading edge of the original is detected by a registration sensor 17, the original conveying speed is reduced while the original is conveyed a predetermined conveying distance, so that the original is temporarily stopped before a scanning position 20. Then, a registration stop signal is transmitted to the main control unit. When a scanning start signal from the main control unit is received, the original in a registration stop state is conveyed in such a manner that the original conveying speed is increased to a predetermined conveying speed before the leading edge of the original reaches the scanning position 20.

When a single side of an original is scanned, the original is conveyed through the first scanning conveying unit E to the discharging unit G through the second scanning conveying unit F. In the conveying of the original, a discharging motor is rotated in a normal rotational direction so as to rotate a pair of discharging rollers 30 counterclockwise when the leading edge of the original is detected by a discharging sensor 24. In the conveying of the original, the rotational speed of the discharging motor is controlled so that the original is discharged on a discharge tray 29 without flying out from the discharge tray 29, in the following manner. The rotational speed of the discharging motor is reduced just before the trailing edge of the original passes though the nip between the discharging rollers 30 provided in the up-down direction. This operation timing is determined by counting the discharging motor pulses from when the leading edge of the original is detected by the discharging sensor 24.

When the double sides of an original are scanned, the counting of the pulses of the scanning motor starts when the leading edge of the original is detected by the discharging sensor 24, and operational timing when the leading edge of the original reaches a second image scanning unit 25 is determined by the counted pulses. From the operational timing until the trailing edge of the original passes through the scanning unit, a gate signal indicating an effective image region in a sub-scanning direction is continued to be transmitted to the second image scanning unit 25. A second scanning roller 26 prevents the original from being floated in a second scanning unit, and plays a role of a standard white section for acquiring shading data in the second scanning unit.

Figure 2:
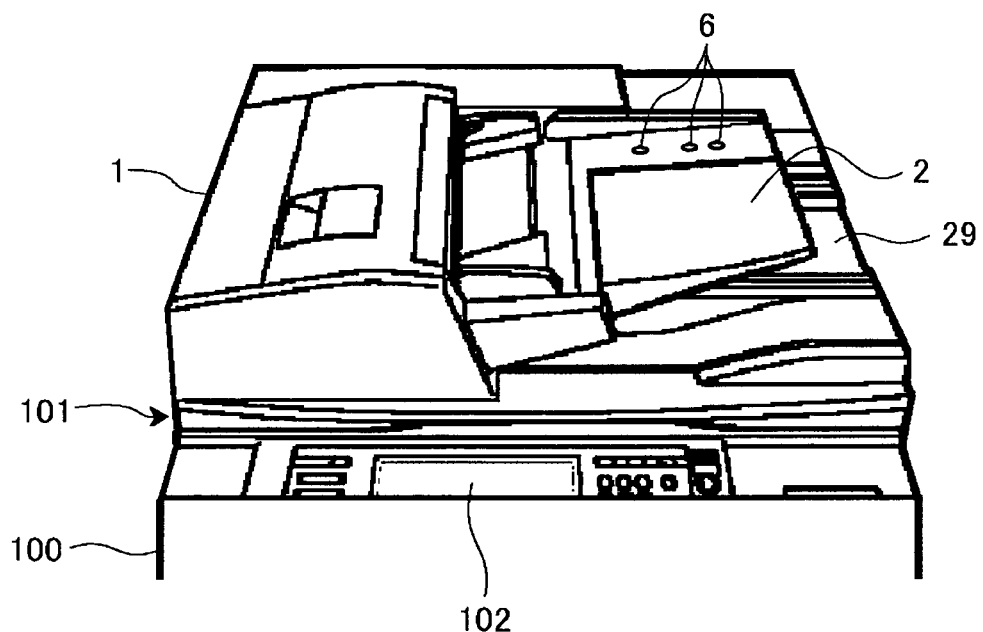
FIG. 2 is a partial external view illustrating part of an image forming apparatus including the automatic document feeder.

FIG. 2 is a partial external view illustrating part of an image forming apparatus including the automatic document feeder 1 thus structured. An image scanning unit 101 is mounted on the uppermost part of an image forming apparatus main body 100, and the ADF 1 is mounted on the image scanning unit 101. The image forming apparatus main body 100 is provided with an operating unit 102 on an upper surface thereof in front of the ADF 1.

As can be seen from FIG. 2, light such as lighting in a room easily enters the original detection sensor 6 that detects an original set on the original table 2 because the original table 2 of the ADF 1 is open upward. Because of the structure, conventional apparatuses have problems in that erroneous detection occurs in an original sensor due to disturbance light such as lighting, thereby causing original detection error. The automatic document feeder of the present invention includes a structure to prevent effect of disturbance light as described below.

Figure 3A:
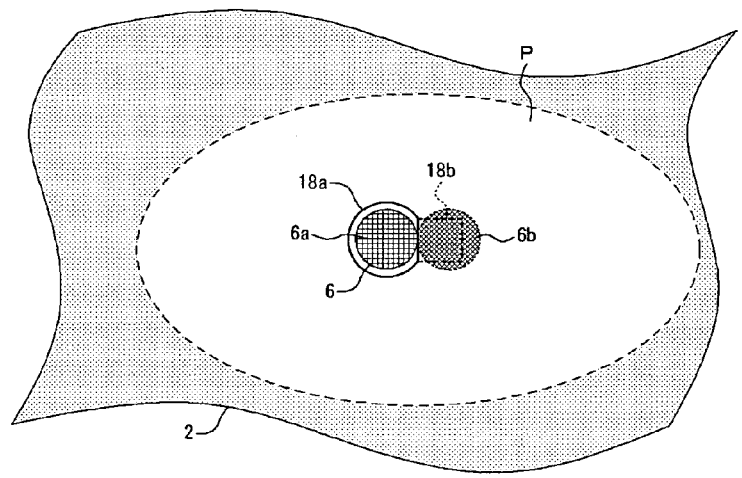
FIGS. 3A and 3B are schematics illustrating a first embodiment of a disturbance light prevention structure for an original detection sensor.
Figure 3B:
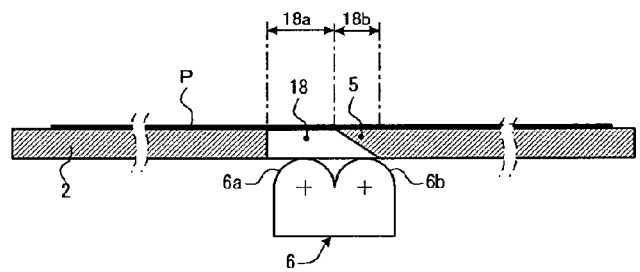

FIGS. 3A and 3B are schematics illustrating a first embodiment of a disturbance light prevention structure for the original detection sensor 6 disposed under the original table 2. In the embodiment, the original detection sensor 6 includes the three sensors 61 to 63 as described above. The three sensors 61 to 63 are collectively referred to as the original detection sensor 6 and the following description is made based on the original detection sensor 6 because a same disturbance light prevention structure can be applied to each sensor.

Figure 4:
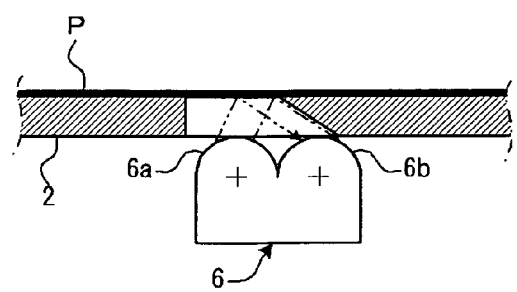
FIG. 4 is a schematic illustrating a state in which light emitted from a light-emitting unit of the sensor is received by a light-receiving unit of the sensor.

As illustrated in FIGS. 3A and 3B, the original detection sensor 6 is disposed the inside of the original table 2 (under a front plate of the original table 2). The original table 2 has an aperture (detection hole) 18 though which sensor light passes (so as to irradiate a lower surface of an original) over the original detection sensor 6. As illustrated in FIG. 4, sensor light emitted from a light-emitting unit 6a of the original detection sensor 6 travels through the detection hole 18 and is reflected by the lower surface of the original bundle P, and then enters and is received by a light-receiving unit 6b of the original detection sensor 6. When no original is set on the original table 2, light emitted from the light-emitting unit 6a is not reflected by an original and thus, is not received by the light-receiving unit 6b.

As illustrated in FIG. 3A as a plan view, the light-emitting unit 6a and the light-receiving unit 6b of the original detection sensor 6 in the first embodiment both have circular planar shapes. In contrast, the detection hole 18 is composed of a light-emitting side portion 18a corresponding to the light-emitting unit 6a and a light-receiving side portion 18b corresponding to the light-receiving unit 6b. In addition, their planar shapes are different from each other. In the embodiment, the planar shape of the light-emitting side portion 18a is a roughly circular shape while the planar shape of the light-receiving side portion 18b is a square.

In addition, as illustrated in FIG. 3B as a sectional side view, the light-emitting side portion 18a of the detection hole 18 passes through the original table 2 so as to be open on both sides thereof while the light-receiving side portion 18b does not pass though the original table 2 and is shielded by a light-shielding portion 5. As illustrated in FIG. 4, the light-shielding portion 5 is formed to have a slanted surface facing the light-receiving unit 6b so that the light-receiving unit 6b can receive light that is emitted from the light-emitting unit 6a and is reflected by the original bundle P. Accordingly, the cross-sectional shape of the detection hole 18 is a trapezoid.

The light-receiving side portion 18b is indicated with the dot-line in FIG. 3A serving as a plan view because the light-receiving side portion 18b does not pass through the original table 2 as described above. The planar shape of the light-receiving side portion 18b indicated with the dot-line represents the planar shape or a plane projected shape of a hole bottom portion of the light-receiving side portion 18b. In FIG. 3A serving as a plan view, the light-receiving unit 6b disposed under the original table 2 is also indicated with the dot-line.

In this way, the detection hole 18 including the light-emitting side portion 18a and the light-receiving side portion 18b that have different planar shapes from each other is provided over the original detection sensor 6, and the light-shielding portion 5 having a slanted surface facing the light-receiving unit 6b (a slanted surface overhanging the light-receiving unit 6b) is provided so as to overhang and cover the light-receiving unit 6b. This structure can prevent the light-receiving unit 6b from receiving disturbance light other than sensor light reflected by the original bundle P and can effectively prevent original detection error due to disturbance light. While the light-shielding portion 5 is formed as an integral part of the original table 2 in the embodiment, a light-shielding portion 5 can be provided as an individual element (a different member) that is not an integral part of the original table 2.

Figure 5A:
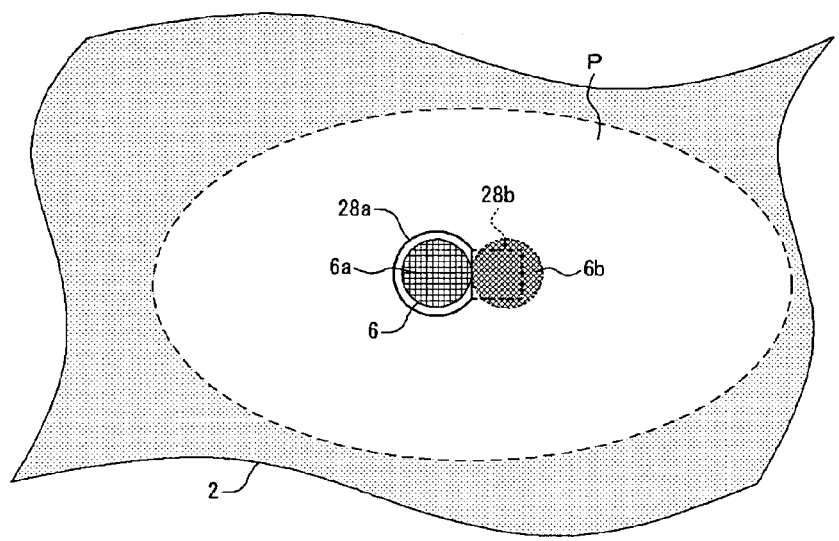
FIGS. 5A and 5B are schematics illustrating a second embodiment of a disturbance light prevention structure for an original detection sensor.
Figure 5B:
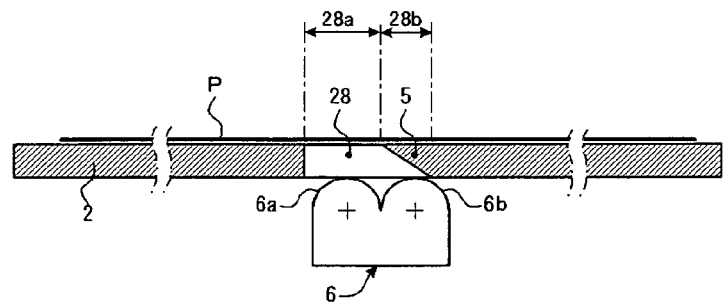

FIGS. 5A and 5B are schematics illustrating a second embodiment of a disturbance light prevention structure for the original detection sensor 6 disposed under the original table 2. The second embodiment has basically the same structure of the first embodiment illustrated in FIGS. 3A and 3B. The duplicated description is thus omitted and a difference is described below.

As illustrated in FIG. 5A as a plan view, a detection hole 28 has a light-emitting side portion 28a and a light-receiving side portion 28b that have different planar shapes from each other. In the second example, the light-receiving side portion 28b is smaller than the light-emitting side portion 28a (an area of the planar shape of the light-receiving side portion 28b is smaller than that of the light-emitting side portion 28a). As illustrated in FIG. 5B, the light-shielding portion 5 is provided above the light-receiving side portion 28b in the same manner as the first embodiment.

In this way, the detection hole 28 including the light-emitting side portion 28a and the light-receiving side portion 28b smaller than the light-emitting side portion 28a is provided over the original detection sensor 6, and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light.

Figure 6A:
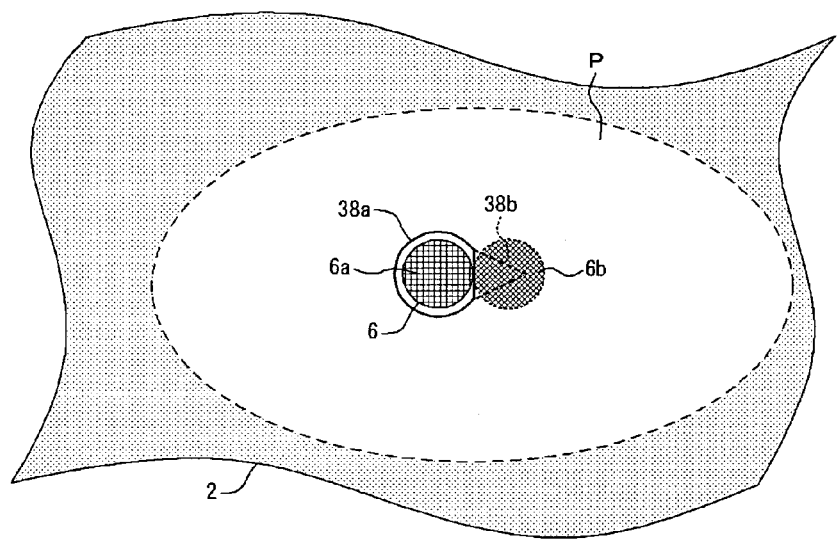
FIGS. 6A and 6B are schematics illustrating a third embodiment of a disturbance light prevention structure for an original detection sensor.
Figure 6B:
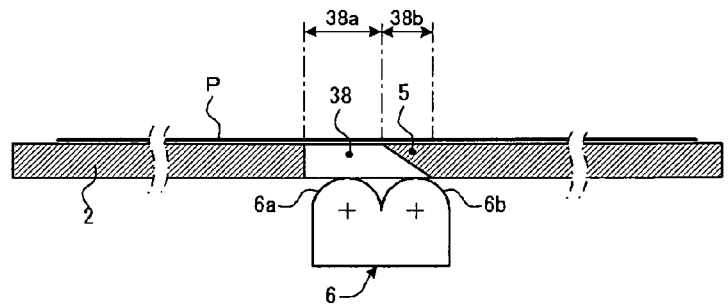

FIGS. 6A and 6B are schematics illustrating a third embodiment of a disturbance light prevention structure for the original detection sensor 6 disposed under the original table 2. The third embodiment has basically the same structure of the first embodiment illustrated in FIGS. 3A and 3B. The duplicated description is thus omitted and a difference is described below.

As illustrated in FIG. 6A as a plan view, a detection hole 38 has a light-emitting side portion 38a and a light-receiving side portion 38b that have different planar shapes from each other. In the third embodiment, the planar shape of the light-emitting side portion 38a is a roughly circular shape while the planar shape of the light-receiving side portion 38b is a triangle. The planar shape of the light-receiving side portion 38b is an isosceles triangle (including an equilateral triangle) having one side facing a light-emitting side (the light-emitting portion 6a) and a vertex opposite the one side. As illustrated in FIG. 6B, the light-shielding portion 5 is provided above the light-receiving side portion 38b in the same manner as the first embodiment.

In this way, the detection hole 38 including the light-emitting side portion 38a whose planar shape is a roughly circular shape and the light-receiving side portion 38b whose planar shape is a triangle is provided over the original detection sensor 6, and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The third embodiment particularly can effectively prevent effect of the following light, because of the shape of the detection hole 38. Ambient light entered from the both sides in a direction orthogonal to an original feed direction (from the right to the left in FIGS. 6A and 6B), i.e., light entering the original table 2 from a front side of the apparatus and from a rear side of the apparatus in FIG. 2, and ambient light entered from a rear side in the original feed direction, i.e., light entering the original table 2 from the right side of the apparatus in FIG. 2.

Figure 7A:
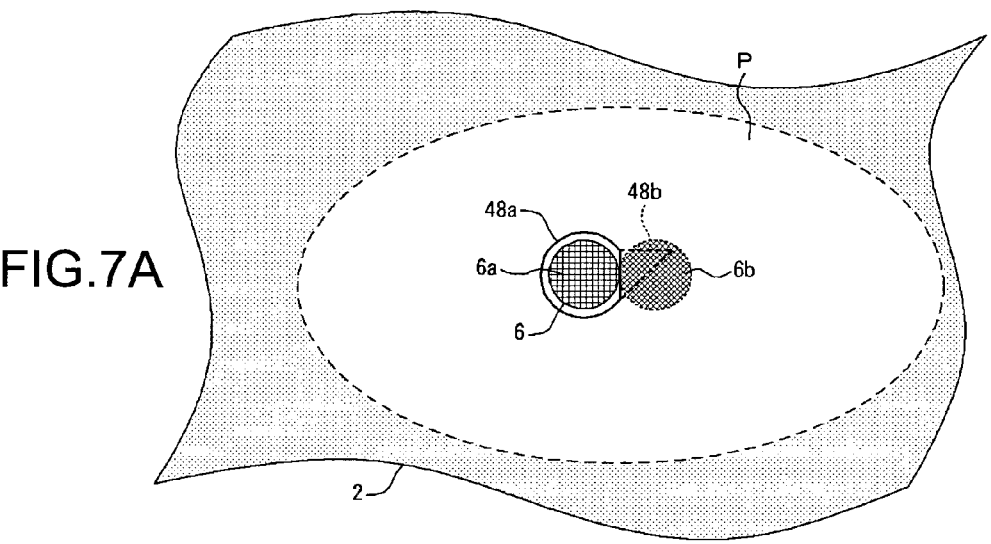
FIGS. 7A and 7B are schematics illustrating a fourth embodiment of a disturbance light prevention structure for an original detection sensor.
Figure 7B:
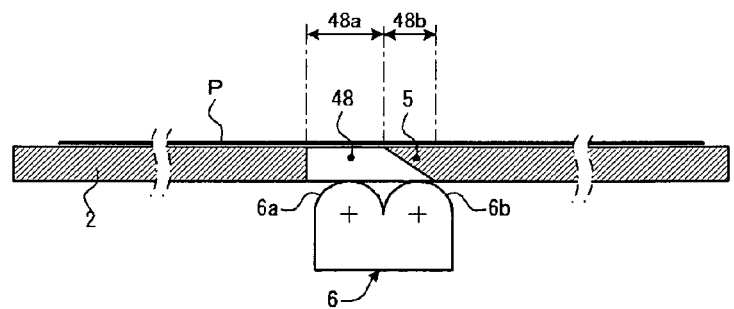

FIGS. 7A and 7B are schematics illustrating a fourth embodiment of a disturbance light prevention structure for the original detection sensor 6 disposed under the original table 2. The fourth embodiment has basically the same structure of the first embodiment illustrated in FIGS. 3A and 3B. The duplicated description is thus omitted and a difference is described below.

As illustrated in FIG. 7A as a plan view, a detection hole 48 has a light-emitting side portion 48a and a light-receiving side portion 48b that have different planar shapes from each other. In the fourth embodiment, the planar shape of the light-emitting side portion 48a is a roughly circular shape while the planar shape of the light-receiving side portion 48b is a wedge shape. The planar shape of the light-receiving side portion 48b is a wedge shape having a tip facing a light-receiving side (the light-receiving unit 6b). In the embodiment, the planar shape is a right triangle having one side facing the light-emitting side and a vertex opposite the one side. As illustrated in FIG. 7B, the light-shielding portion 5 is provided above the light-receiving side portion 48b in the same manner as the first embodiment.

In this way, the detection hole 48 including the light-emitting side portion 48a whose planar shape is a roughly circular shape and the light-receiving side portion 48b whose planar shape is a wedge shape is provided over the original detection sensor 6, and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The fourth embodiment particularly can effectively prevent effect of ambient light when intensity of ambient light entered from the both sides in the direction orthogonal to the original feed direction is larger than that of ambient light entered from the rear side in the original feed direction, because of the shape of the detection hole 48.

Figure 8A:
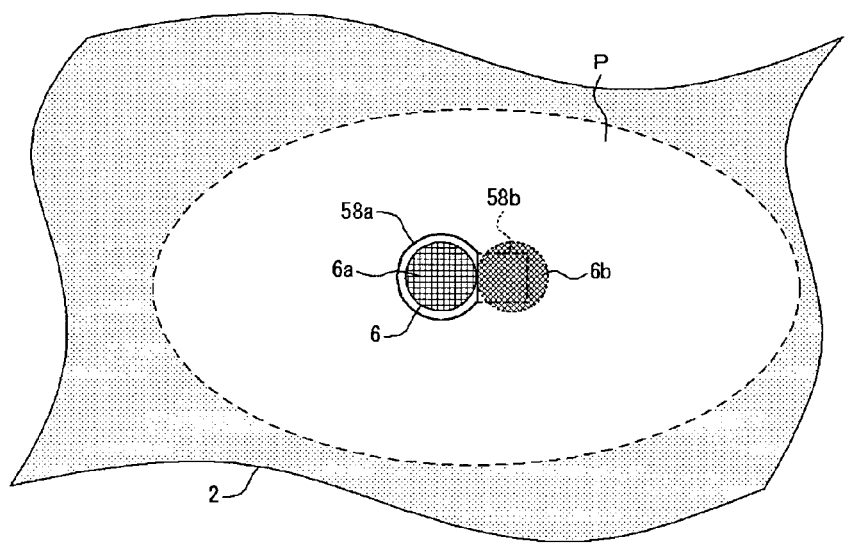
FIGS. 8A and 8B are schematics illustrating a fifth embodiment of a disturbance light prevention structure for an original detection sensor.
Figure 8B:
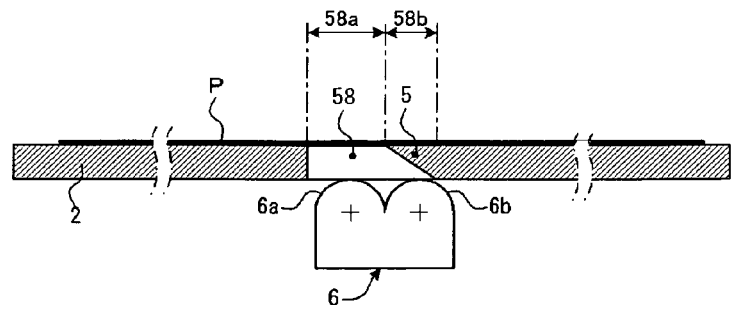

FIGS. 8A and 8B are schematics illustrating a fifth embodiment of a disturbance light prevention structure for the original detection sensor 6 disposed under the original table 2. The fifth embodiment has basically the same structure of the first embodiment illustrated in FIGS. 3A and 3B. The duplicated description is thus omitted and a difference is described below.

As illustrated in FIG. 8A as a plan view, a detection hole 58 has a light-emitting side portion 58a and a light-receiving side portion 58b that have different planar shapes from each other. In the fifth embodiment, the planar shape of the light-emitting side portion 58a is a roughly circular shape while the planar shape of the light-receiving side portion 58b is a square (quadrate). As illustrated in FIG. 8B, the light-shielding portion 5 is provided above the light-receiving side portion 58b in the same manner as the first embodiment.

In this way, the detection hole 58 including the light-emitting side portion 58a whose planar shape is a roughly circular shape and the light-receiving side portion 58b whose planar shape is a square (quadrate) is provided over the original detection sensor 6, and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The fifth embodiment particularly can effectively prevent effect of ambient light evenly entered from the both sides in the direction orthogonal to the original feed direction and the rear side in the original feed direction, because of the shape of the detection hole 58.

Figure 9A:
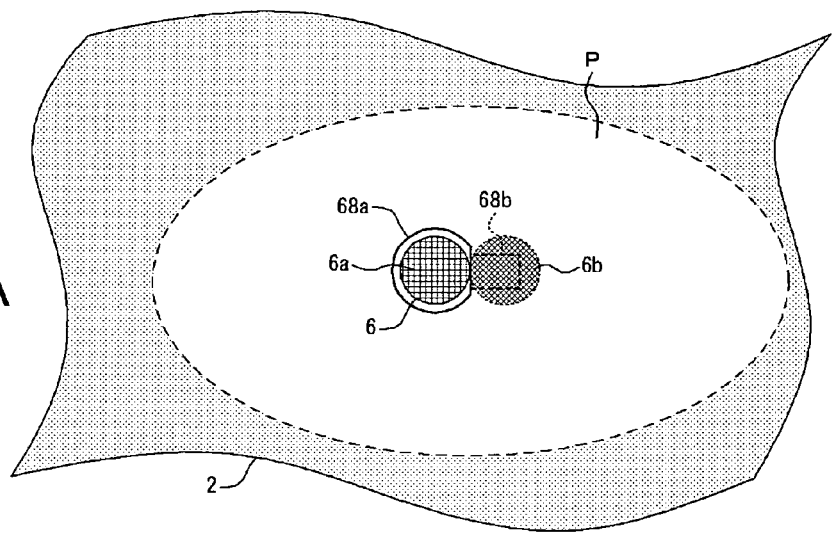
FIGS. 9A and 9B are schematics illustrating a sixth embodiment of a disturbance light prevention structure for an original detection sensor.
Figure 9B:
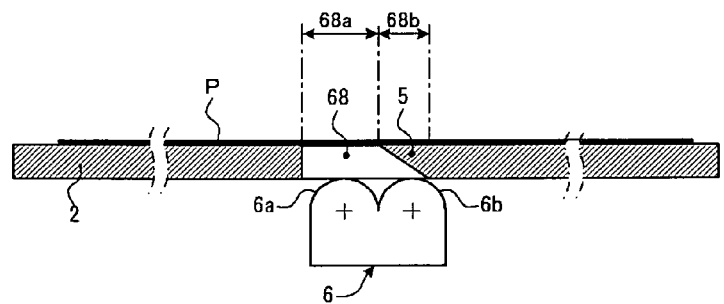

FIGS. 9A and 9B are schematics illustrating a sixth embodiment of a disturbance light prevention structure for the original detection sensor 6 disposed under the original table 2. The sixth embodiment has basically the same structure of the first embodiment illustrated in FIGS. 3A and 3B. The duplicated description is thus omitted and a difference is described below.

As illustrated in FIG. 9A as a plan view, a detection hole 68 has a light-emitting side portion 68a and a light-receiving side portion 68b that have different planar shapes from each other. In the sixth embodiment, the planar shape of the light-emitting side portion 68a is a roughly circular shape while the planar shape of the light-receiving side portion 68b is a rectangle (rectangle elongated in the original feed direction). As illustrated in FIG. 9B, the light-shielding portion 5 is provided above the light-receiving side portion 58b in the same manner as the first embodiment.

In this way, the detection hole 68 including the light-emitting side portion 68a whose planar shape is a roughly circular shape and the light-receiving side portion 68b whose planar shape is a rectangle (rectangle elongated in the original feed direction) is provided over the original detection sensor 6, and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The sixth embodiment particularly can effectively prevent effect of ambient light when intensity of ambient light entered from the both sides in the direction orthogonal to the original feed direction is slightly larger than that of ambient light entered from the rear side in the original feed direction, because of the shape of the detection hole 68.

Figure 10A:
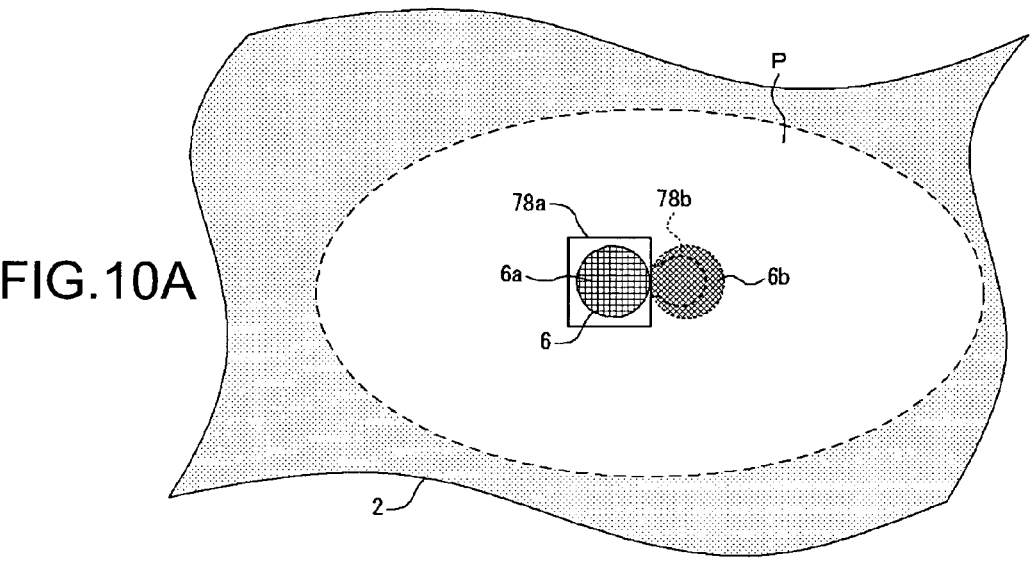
FIGS. 10A and 10B are schematics illustrating a seventh embodiment of a disturbance light prevention structure for an original detection sensor.
Figure 10B:
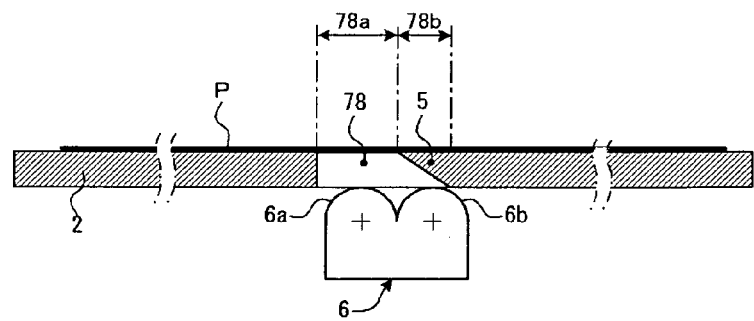

FIGS. 10A and 10B are schematics illustrating a seventh embodiment of a disturbance light prevention structure for the original detection sensor 6 disposed under the original table 2. The seventh embodiment has basically the same structure of the first embodiment illustrated in FIGS. 3A and 3B. The duplicated description is thus omitted and a difference is described below.

As illustrated in FIG. 10A as a plan view, a detection hole 78 has a light-emitting side portion 78a and a light-receiving side portion 78b that have different planar shapes from each other. In the seventh embodiment, the planar shape of the light-emitting side portion 78a is a square (quadrate) while the planar shape of the light-receiving side portion 78b is a roughly circular shape. As illustrated in FIG. 10B, the light-shielding portion 5 is provided above the light-receiving side portion 78b in the same manner as the first embodiment.

In this way, the detection hole 78 including the light-emitting side portion 78a whose planar shape is a square (quadrate) and the light-receiving side portion 78b whose planar shape is a roughly circular shape is provided over the original detection sensor 6, and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The seventh embodiment particularly can effectively prevent effect of ambient light entered from all directions, because of the shape of the detection hole 78.

Figure 11A:
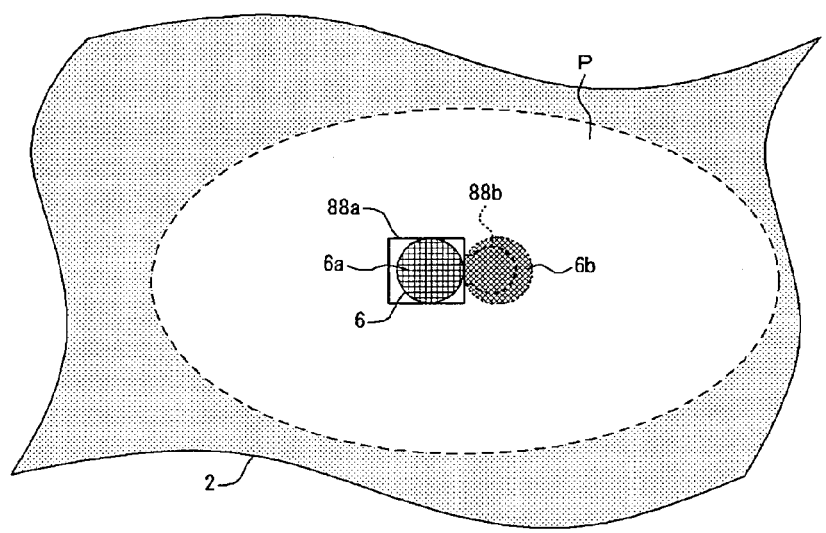
FIGS. 11A and 11B are schematics illustrating an eighth embodiment of a disturbance light prevention structure for an original detection sensor.
Figure 11B:
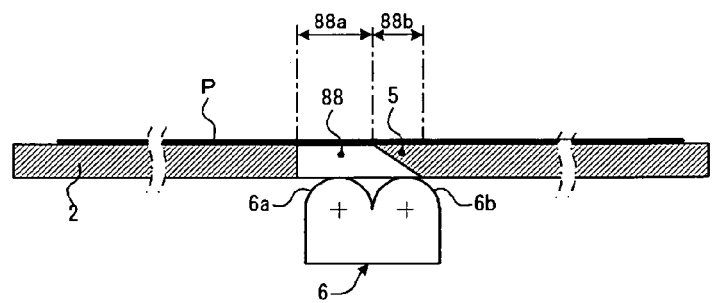

FIGS. 11A and 11B are schematics illustrating an eighth embodiment of a disturbance light prevention structure for the original detection sensor 6 disposed under the original table 2. The eighth embodiment has basically the same structure of the first embodiment illustrated in FIGS. 3A and 3B. The duplicated description is thus omitted and a difference is described below.

As illustrated in FIG. 11A as a plan view, a detection hole 88 has a light-emitting side portion 88a and a light-receiving side portion 88b that have different planar shapes from each other. In the eighth embodiment, the planar shape of the light-emitting side portion 88a is a rectangle (rectangle elongated in the original feed direction) while the planar shape of the light-receiving side portion 68b is a roughly circular shape. As illustrated in FIG. 11B, the light-shielding portion 5 is provided above the light-receiving side portion 88b in the same manner as the first embodiment.

In this way, the detection hole 88 including the light-emitting side portion 88a whose planar shape is a square (rectangle) and the light-receiving side portion 88b whose planar shape is a roughly circular shape is provided over the original detection sensor 6, and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The eighth embodiment particularly can effectively prevent effect of ambient light entered from all directions, because of the shape of the detection hole 88.

Figure 12A:
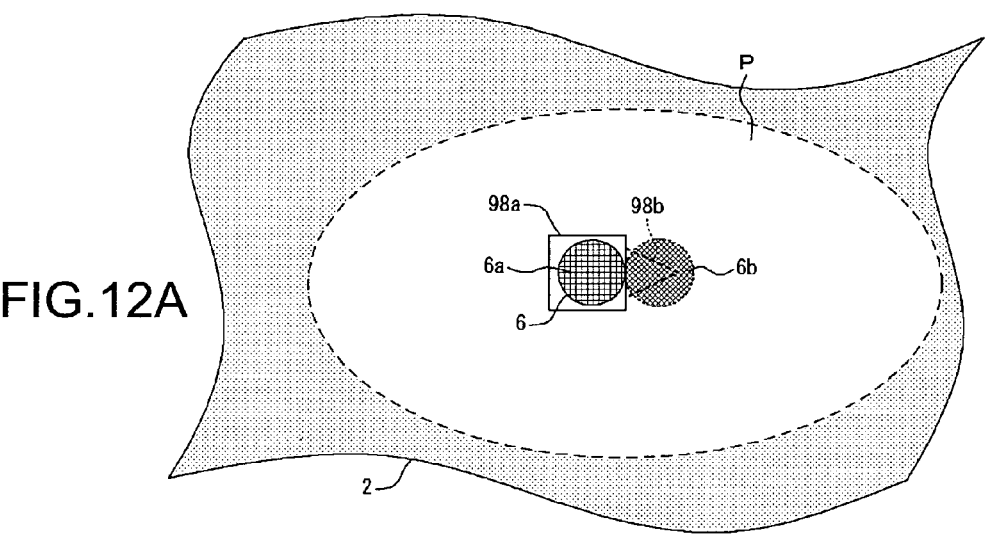
FIGS. 12A and 12B are schematics illustrating a ninth embodiment of a disturbance light prevention structure for an original detection sensor.
Figure 12B:
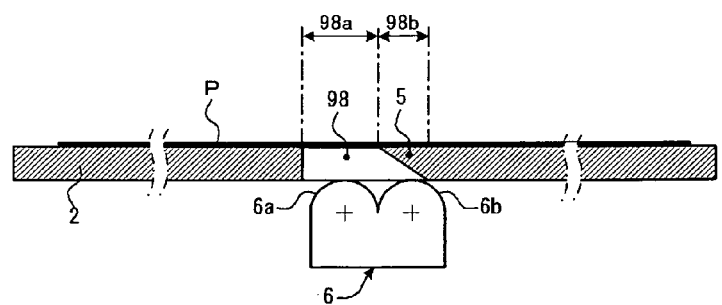

FIGS. 12A and 12B are schematics illustrating a ninth embodiment of a disturbance light prevention structure for the original detection sensor 6 disposed under the original table 2. The ninth embodiment has basically the same structure of the first embodiment illustrated in FIGS. 3A and 3B. The duplicated description is thus omitted and a difference is described below.

As illustrated in FIG. 12A as a plan view, a detection hole 98 has a light-emitting side portion 98a and a light-receiving side portion 98b that have different planar shapes from each other. In the ninth embodiment, the planar shape of the light-emitting side portion 98a is a square (quadrate) while the planar shape of the light-receiving side portion 98b is a triangle. The planar shape of the light-receiving side portion 98b is an isosceles triangle having one side facing the light-emitting side and a vertex opposite the one side, and includes an equilateral triangle. As illustrated in FIG. 12B, the light-shielding portion 5 is provided above the light-receiving side portion 98b in the same manner as the first embodiment.

In this way, the detection hole 98 including the light-emitting side portion 98a whose planar shape is a square (quadrate) and the light-receiving side portion 98b whose planar shape is a triangle is provided over the original detection sensor 6, and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The ninth embodiment particularly can effectively prevent effect of ambient light entered from the both sides in the direction orthogonal to the original feed direction and the rear side in the original feed direction, because of the shape of the detection hole 98.

Figure 13A:
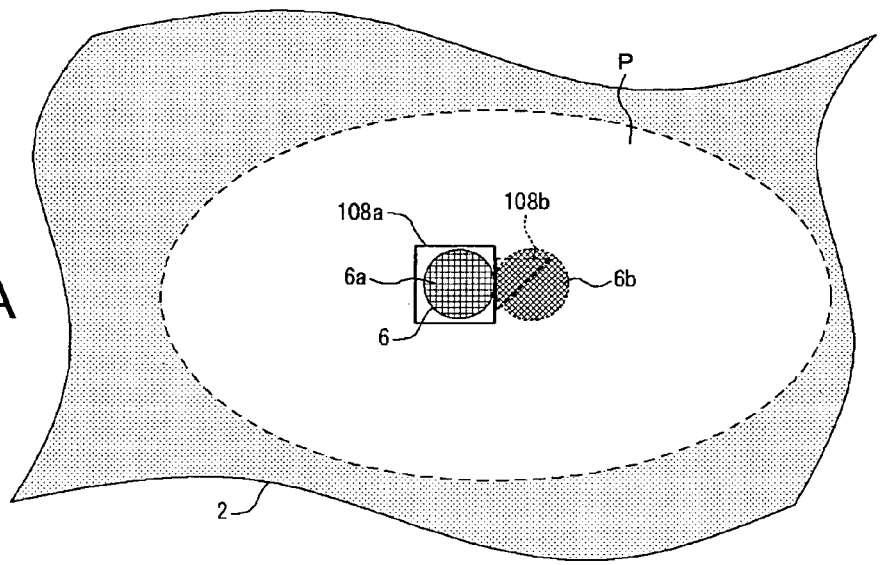
FIGS. 13A and 13B are schematics illustrating a tenth embodiment of a disturbance light prevention structure for an original detection sensor.
Figure 13B:
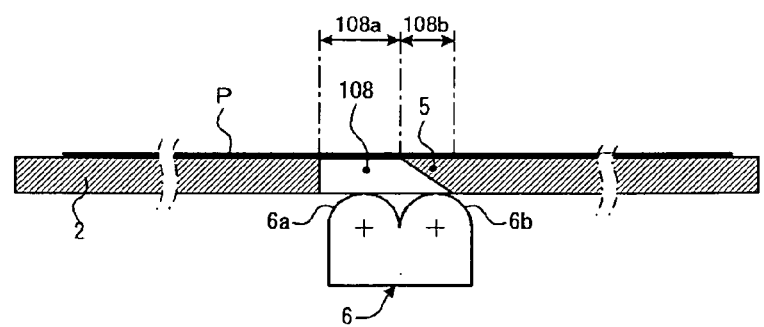

FIGS. 13A and 13B are schematics illustrating a tenth embodiment of a disturbance light prevention structure for the original detection sensor 6 disposed under the original table 2. The tenth embodiment has basically the same structure of the first embodiment illustrated in FIGS. 3A and 3B. The duplicated description is thus omitted and a difference is described below.

As illustrated in FIG. 13A as a plan view, a detection hole 108 has a light-emitting side portion 108a and a light-receiving side portion 108b that have different planar shapes from each other. In the tenth embodiment, the planar shape of the light-emitting side portion 108a is a square (quadrate) while the planar shape of the light-receiving side portion 108b is a wedge shape. The planar shape of the light-receiving side portion 108b is a wedge shape having a tip facing the light-receiving side. In the embodiment, the planar shape is a right triangle having one side facing the light-emitting side and a vertex opposite the one side. As illustrated in FIG. 13B, the light-shielding portion 5 is provided above the light-receiving side portion 108*b* in the same manner as the first embodiment.

In this way, the detection hole 108 including the light-emitting side portion 108*a* whose planar shape is a square (quadrate) and the light-receiving side portion 108*b* whose planar shape is a wedge shape is provided over the original detection sensor 6, and the light-shielding portion 5 having a slanted surface facing the light-receiving unit 6*b* is provided so as to overhang and cover the light-receiving unit 6*b*. This structure can prevent the light-receiving unit 6*b* from receiving disturbance light other than sensor light reflected by the original bundle P and effectively prevent original detection error due to disturbance light. The tenth embodiment particularly can effectively prevent effect of ambient light when intensity of ambient light entered from the both sides in the direction orthogonal to the original feed direction is larger than that of ambient light entered from the rear side in the original feed direction, because of the shape of the detection hole 108.

Figure 14A:
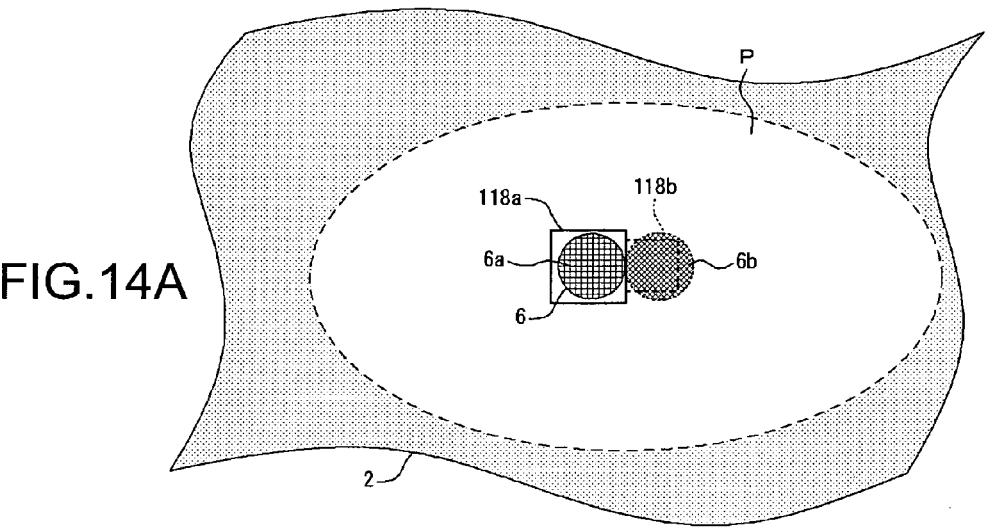
FIGS. 14A and 14B are schematics illustrating an eleventh embodiment of a disturbance light prevention structure for an original detection sensor.
Figure 14B:
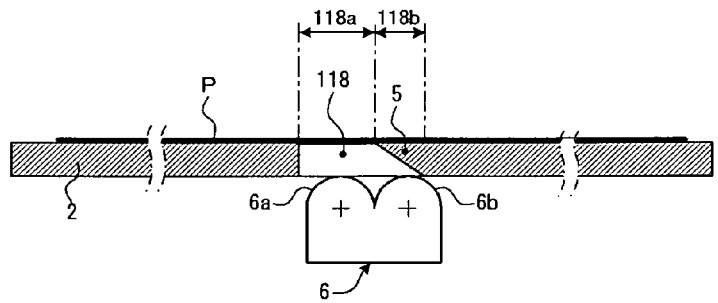

FIGS. 14A and 14B are schematics illustrating an eleventh embodiment of a disturbance light prevention structure for the original detection sensor 6 disposed under the original table 2. The eleventh embodiment has basically the same structure of the first embodiment illustrated in FIGS. 3A and 3B. The duplicated description is thus omitted and a difference is described below.

As illustrated in FIG. 14A as a plan view, a detection hole 118 has a light-emitting side portion 118*a* and a light-receiving side portion 118*b* that have different planar shapes from each other (areas of the planar shapes are different from each other in the eleventh embodiment). In the embodiment, the planar shape of the light-emitting side portion 118*a* is a square (quadrate) and the planar shape of the light-receiving side portion 118*b* is also a square (quadrate). An area of the planar shape of the light-emitting side portion 118*a* is larger than that of the light-receiving side portion 118*b*. As illustrated in FIG. 14B, the light-shielding portion 5 is provided above the light-receiving side portion 118*b* in the same manner as the first embodiment.

In this way, the detection hole 118 including the light-emitting side portion 118*a* and the light-receiving side portion 118*b*, an area of the planar shape of which is larger than that of the light-emitting side portion 118*a*, is provided over the original detection sensor 6 (each of the planar shape is a square (quadrate)), and the light-shielding portion 5 having a slanted surface facing the light-receiving unit 6*b* is provided so as to overhang and cover the light-receiving unit 6*b*. This structure can prevent the light-receiving unit 6*b* from receiving disturbance light other than sensor light reflected by the original bundle P and effectively prevent original detection error due to disturbance light. The eleventh embodiment particularly can effectively prevent effect of ambient light evenly entered from the both sides in the direction orthogonal to the original feed direction and the rear side in the original feed direction; because of the shape of the detection hole 118.

Figure 15A:
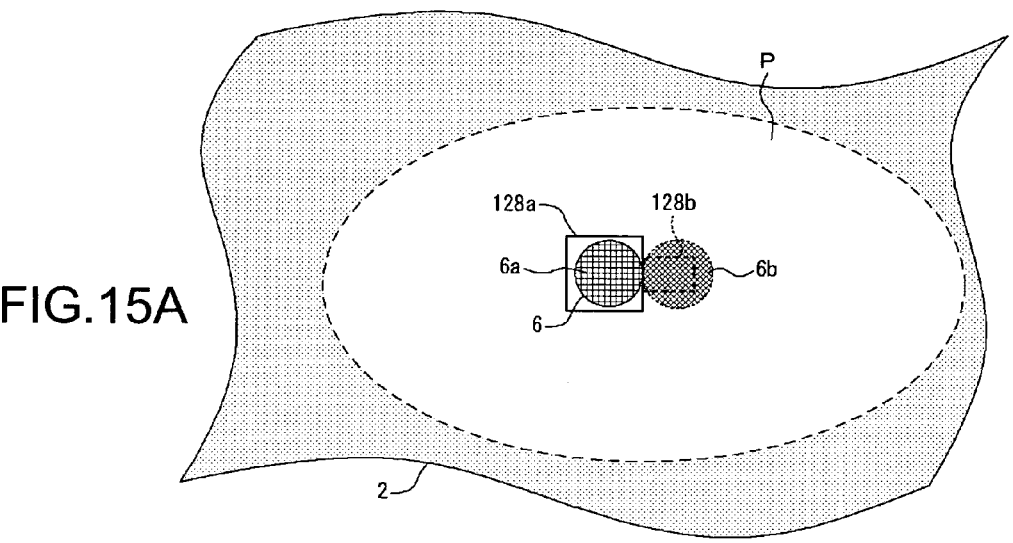
FIGS. 15A and 15B are schematics illustrating a twelfth embodiment of a disturbance light prevention structure for an original detection sensor.
Figure 15B:
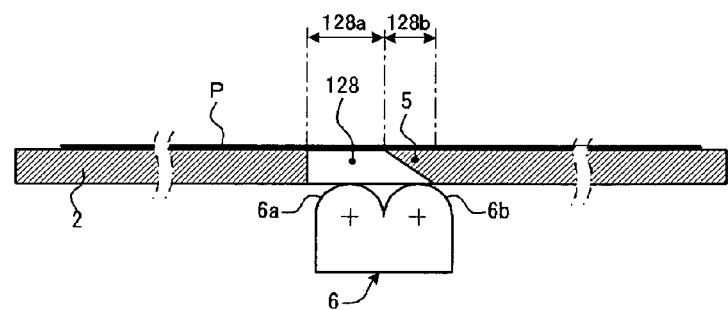

FIGS. 15A and 15B are schematics illustrating a twelfth embodiment of a disturbance light prevention structure for the original detection sensor 6 disposed under the original table 2. The twelfth embodiment has basically the same structure of the first embodiment illustrated in FIGS. 3A and 3B. The duplicated description is thus omitted and a difference is described below.

As illustrated in FIG. 15A as a plan view, a detection hole 128 has a light-emitting side portion 128*a* and a light-receiving side portion 128*b* that have different planar shapes from each other. In the twelfth embodiment, the planar shape of the light-emitting side portion 128*a* is a square (quadrate) while the planar shape of the light-receiving side portion 128*b* is a rectangle. As illustrated in FIG. 15B, the light-shielding portion 5 is provided at upper end of the light-receiving side portion 128*b* in the same manner as the first embodiment.

In this way, the detection hole 128 including the light-emitting side portion 128*a* whose planar shape is a square (quadrate) and the light-receiving side portion 128*b* whose planar shape is a rectangle is provided over the original detection sensor 6, and the light-shielding portion 5 having a slanted surface facing the light-receiving unit 6*b* is provided so as to overhang and cover the light-receiving unit 6*b*. This structure can prevent the light-receiving unit 6*b* from receiving disturbance light other than sensor light reflected by the original bundle P and effectively prevent original detection error due to disturbance light. The twelfth embodiment particularly can effectively prevent effect of ambient light when intensity of ambient light entered from the both sides in the direction orthogonal to the original feed direction is slightly larger than that of ambient light entered from the rear side in the original feed direction, because of the shape of the detection hole 128.

Figure 16A:
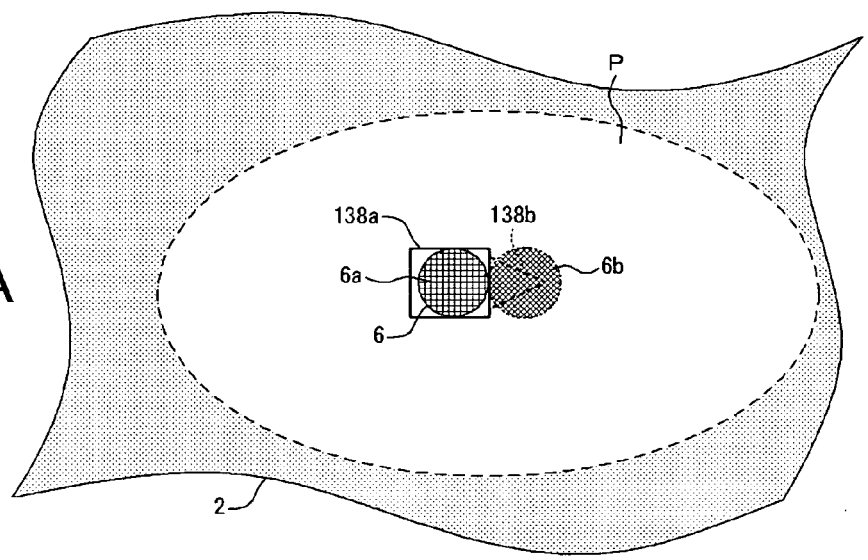
FIGS. 16A and 16B are schematics illustrating a thirteenth embodiment of a disturbance light prevention structure for an original detection sensor.
Figure 16B:
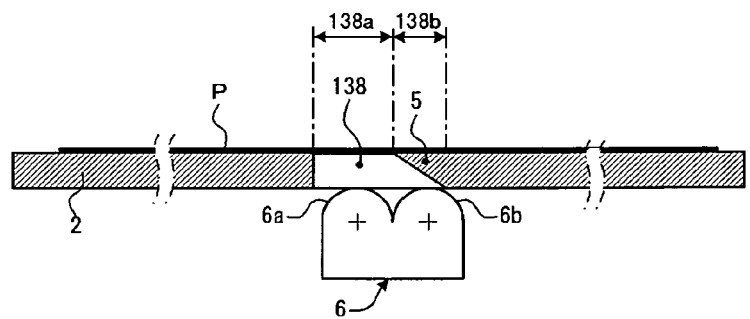

FIGS. 16A and 16B are schematics illustrating a thirteenth embodiment of a disturbance light prevention structure for the original detection sensor 6 disposed under the original table 2. The thirteenth embodiment has basically the same structure of the first embodiment illustrated in FIGS. 3A and 3B. The duplicated description is thus omitted and a difference is described below.

As illustrated in FIG. 16A as a plan view, a detection hole 138 has a light-emitting side portion 138*a* and a light-receiving side portion 138*b* that have different planar shapes from each other. In the thirteenth embodiment, the planar shape of the light-emitting side portion 138*a* is a square (rectangle) while the planar shape of the light-receiving side portion 138*b* is a triangle. The planar shape of the light-receiving side portion 138*b* is an isosceles triangle (including an equilateral triangle) having one side facing the light-emitting side and a vertex opposite the one side. As illustrated in FIG. 16B, the light-shielding portion 5 is provided above the light-receiving side portion 138*b* in the same manner as the first embodiment.

In this way, the detection hole 138 including the light-emitting side portion 138*a* whose planar shape is a square (rectangle) and the light-receiving side portion 138*b* whose planar shape is a triangle is provided over the original detection sensor 6, and the light-shielding portion 5 having a slanted surface facing the light-receiving unit 6*b* is provided so as to overhang and cover the light-receiving unit 6*b*. This structure can prevent the light-receiving unit 6*b* from receiving disturbance light other than sensor light reflected by the original bundle P and effectively prevent original detection error due to disturbance light. The thirteenth embodiment particularly can effectively prevent effect of ambient light entered from the both sides in the direction orthogonal to the original feed direction and the rear side in the original feed direction, because of the shape of the detection hole 138.

Figure 17A:
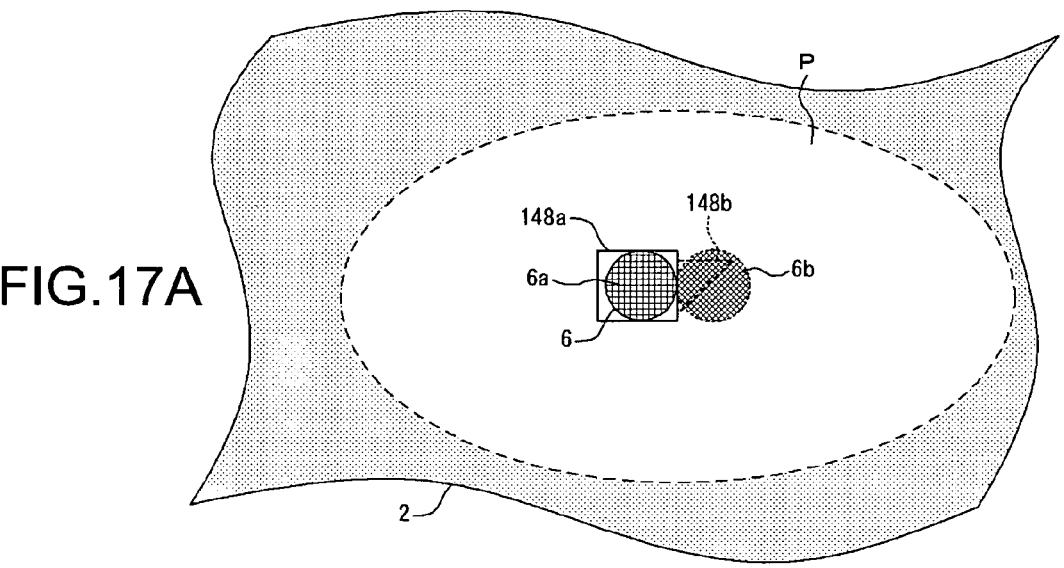
FIGS. 17A and 17B are schematics illustrating a fourteenth embodiment of a disturbance light prevention structure for an original detection sensor.
Figure 17B:
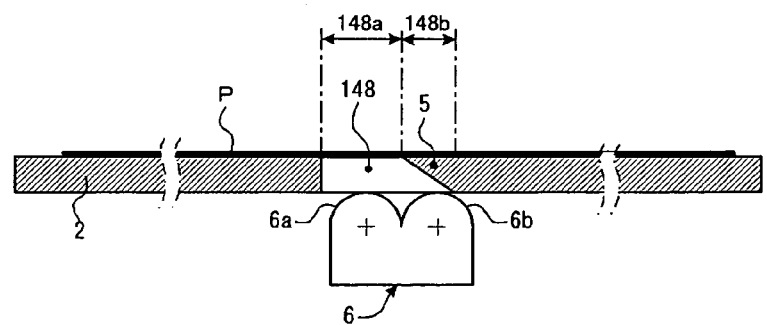

FIGS. 17A and 17B are schematics illustrating a fourteenth embodiment of a disturbance light prevention structure for the original detection sensor 6 disposed under the original table 2. The fourteenth embodiment has basically the same structure of the first embodiment illustrated in FIGS. 3A and 3B. The duplicated description is thus omitted and a difference is described below.

As illustrated in FIG. 17A as a plan view, a detection hole 148 has a light-emitting side portion 148*a* and a light-receiving side portion 148*b* that have different planar shapes from each other. In the fourteenth embodiment, the planar shape of the light-emitting side portion 148a is a square (rectangle) while the planar shape of the light-receiving side portion 148b is a wedge shape. The planar shape of the light-receiving side portion 148b is a right triangle having one side facing the light-emitting side and a vertex opposite the one side, which is one of wedge shapes. As illustrated in FIG. 16B, the light-shielding portion 5 is provided above the light-receiving side portion 138b in the same manner as the first embodiment.

In this way, the detection hole 148 including the light-emitting side portion 148a whose planar shape is a square (rectangle) and the light-receiving side portion 148b whose planar shape is a wedge shape is provided over the original detection sensor 6, and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The fourteenth embodiment particularly can effectively prevent effect of ambient light when intensity of ambient light entered from the both sides in the direction orthogonal to the original feed direction is larger than that of ambient light entered from the rear side in the original feed direction, because of the shape of the detection hole 148.

Figure 18A:
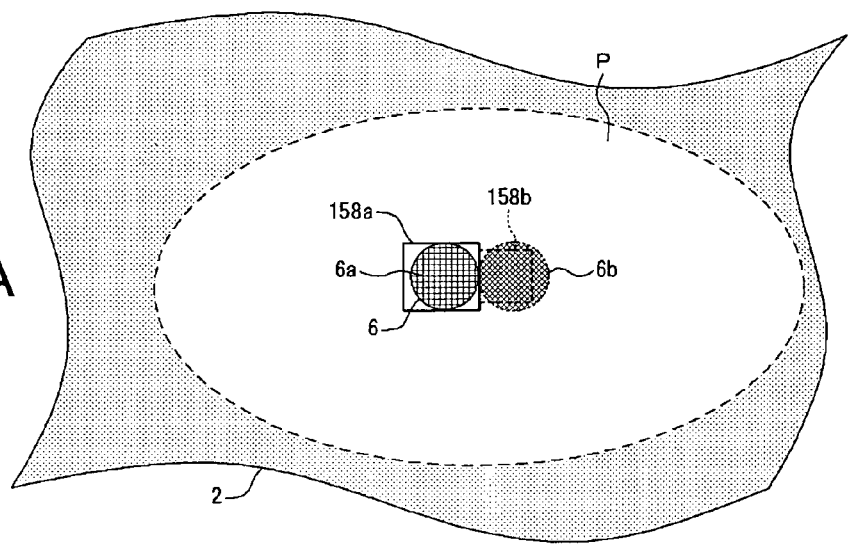
FIGS. 18A and 18B are schematics illustrating a fifteenth embodiment of a disturbance light prevention structure for an original detection sensor.
Figure 18B:
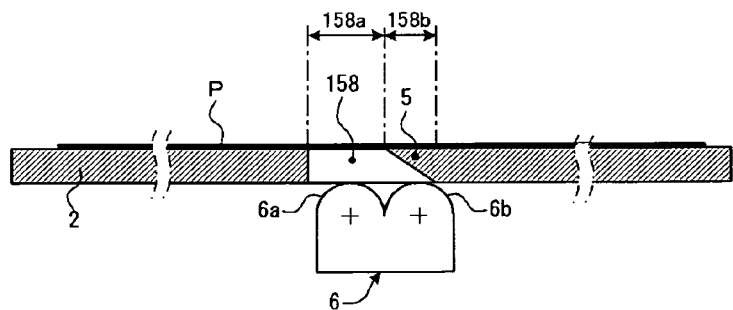

FIGS. 18A and 18B are schematics illustrating a fifteenth embodiment of a disturbance light prevention structure for the original detection sensor 6 disposed under the original table 2. The fifteenth embodiment has basically the same structure of the first embodiment illustrated in FIGS. 3A and 3B. The duplicated description is thus omitted and a difference is described below.

As illustrated in FIG. 18A as a plan view, a detection hole 158 has a light-emitting side portion 158a and a light-receiving side portion 158b that have different planar shapes from each other. In the fifteenth embodiment, the planar shape of the light-emitting side portion 158a is a rectangle while the planar shape of the light-receiving side portion 158b is a square (quadrate). As illustrated in FIG. 18B, the light-shielding portion 5 is provided above the light-receiving side portion 158b in the same manner as the first embodiment.

In this way, the detection hole 158 including the light-emitting side portion 158a whose planar shape is a rectangle and the light-receiving side portion 158b whose planar shape is a square (quadrate) is provided over the original detection sensor 6, and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The fifteenth embodiment particularly can effectively prevent effect of ambient light evenly entered from the both sides in the direction orthogonal to the original feed direction and the rear side in the original feed direction, because of the shape of the detection hole 158.

Figure 19A:
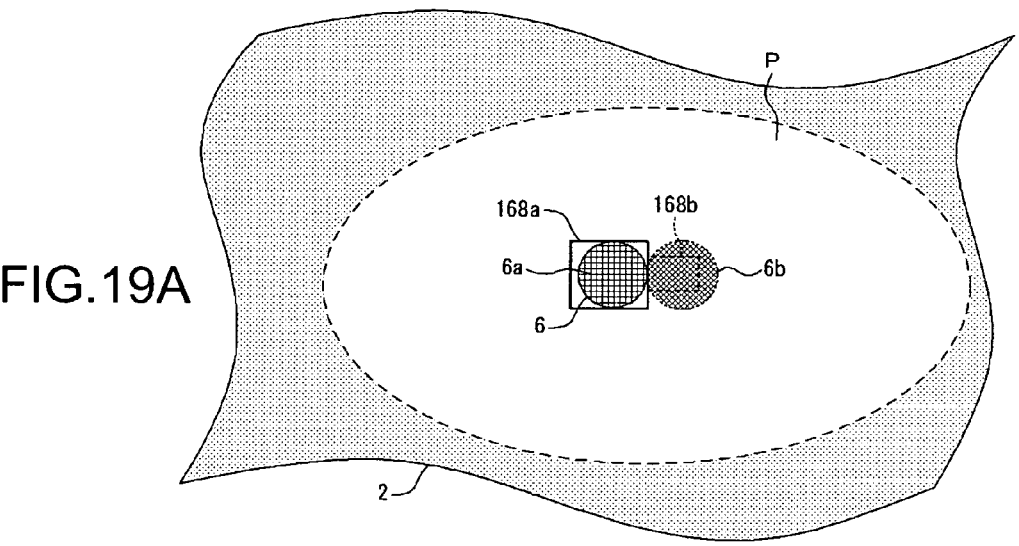
FIGS. 19A and 19B are schematics illustrating a sixteenth embodiment of a disturbance light prevention structure for an original detection sensor.
Figure 19B:
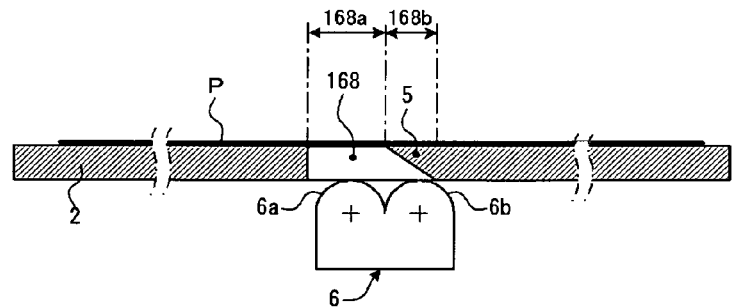

FIGS. 19A and 19B are schematics illustrating a sixteenth embodiment of a disturbance light prevention structure for the original detection sensor 6 disposed under the original table 2. The sixteenth embodiment has basically the same structure of the first embodiment illustrated in FIGS. 3A and 3B. The duplicated description is thus omitted and a difference is described below.

As illustrated in FIG. 19A as a plan view, a detection hole 168 has a light-emitting side portion 168a and a light-receiving side portion 168b that have different planar shapes from each other. In the sixteenth embodiment, the planar shape of the light-emitting side portion 168a is a rectangle and the planar shape of the light-receiving side portion 168b is also a rectangle. An area of the planar shape of the light-receiving side portion 168b is smaller than that of the light-emitting side portion 168a. As illustrated in FIG. 19B, the light-shielding portion 5 is provided above the light-receiving side portion 168b in the same manner as the first embodiment.

In this way, the detection hole 168 including the light-emitting side portion 168a whose planar shape is a rectangle and the light-receiving side portion 168b whose planar shape is also a rectangle is provided over the original detection sensor 6 (an area of the planar shape of the light-receiving side portion 168b is smaller than that of the light-emitting side portion 168a), and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The sixteenth embodiment particularly can effectively prevent effect of ambient light when intensity of ambient light entered from the both sides in the direction orthogonal to the original feed direction is slightly larger than that of ambient light entered from the rear side in the original feed direction, because of the shape of the detection hole 168.

Figure 20A:
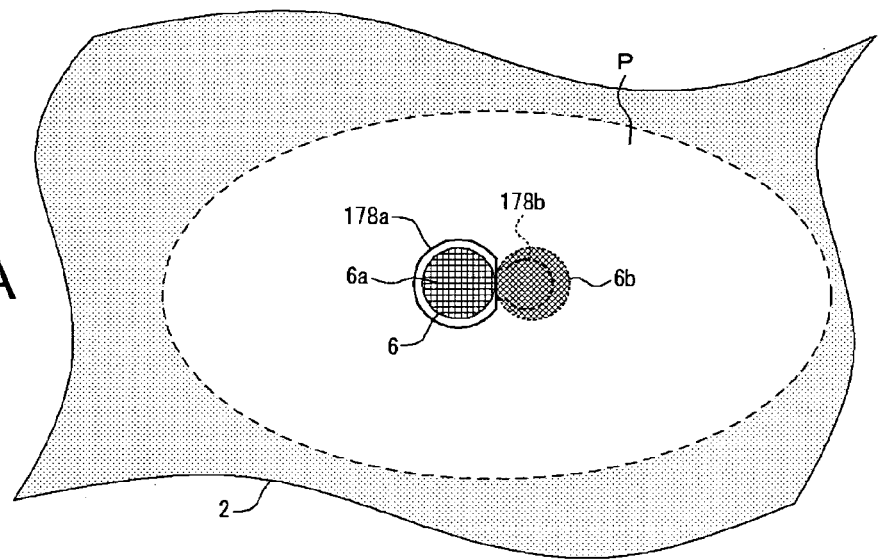
FIGS. 20A and 20B are schematics illustrating a seventeenth embodiment of a disturbance light prevention structure for an original detection sensor.
Figure 20B:
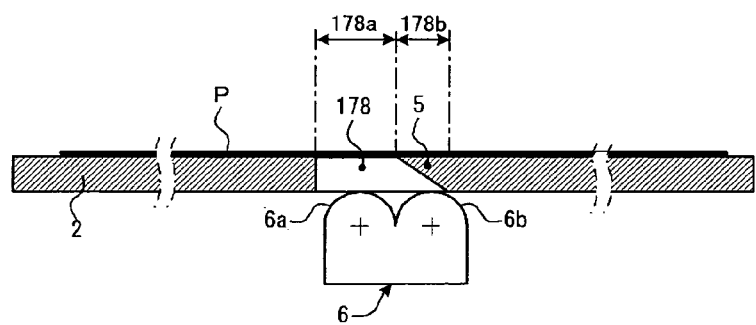

FIGS. 20A and 20B are schematics illustrating a seventeenth embodiment of a disturbance light prevention structure for the original detection sensor 6 disposed under the original table 2. The seventeenth embodiment has basically the same structure of the first embodiment illustrated in FIGS. 3A and 3B. The duplicated description is thus omitted and a difference is described below.

As illustrated in FIG. 20A as a plan view, a detection hole 178 has a light-emitting side portion 178a and a light-receiving side portion 178b that have different planar shapes from each other. In the seventeenth embodiment, the light-receiving side portion 178b is smaller than the light-emitting side portion 178a (each of the planar shape is a roughly circular shape, but an area of the planar shape of the light-receiving side portion 178b is smaller than that of the light-emitting side portion 178a). As illustrated in FIG. 20B, the light-shielding portion 5 is provided above the light-receiving side portion 178b in the same manner as the first embodiment.

In this way, the detection hole 178 including the light-emitting side portion 178a whose planar shape is a roughly circular shape and the light-receiving side portion 178b whose planar shape is also a roughly circular shape is provided over the original detection sensor 6 (an area of the planar shape of the light-receiving side portion 178b is smaller than that of the light-emitting side portion 178a), and the light-shielding portion 5 having a slanted surface facing the light-receiving unit 6b is provided so as to overhang and cover the light-receiving unit 6b. This structure can prevent the light-receiving unit 6b from receiving disturbance light other than sensor light reflected by the original bundle P and effectively prevent original detection error due to disturbance light. The seventeenth embodiment particularly can effectively prevent effect of ambient light evenly entered from the both sides in the direction orthogonal to the original feed direction and a circumferential area in the rear side in the original feed direction, because of the shape of the detection hole 178.

FIGS. 21A and 21B are schematics illustrating an eighteenth embodiment of a disturbance light prevention structure for the original detection sensor 6 disposed under the original table 2. The eighteenth embodiment has basically the same structure of the first embodiment illustrated in FIGS. 3A and 3B. The duplicated description is thus omitted and a difference is described below.

As illustrated in FIG. 21B, a wall surface 188*c* of the light-emitting side of a detection hole 188 is a slanted surface that slants toward the light-receiving side. The light-shielding portion 5 is provided above a light-receiving side portion 188*b* in the same manner as the first embodiment. As for the planer shape of the detection hole 188, the planar shape of a light-emitting side portion 188*a* is a roughly circular shape while the planar shape of the light-receiving side portion 188*b* is a square (quadrate), as illustrated in FIG. 21A serving as a plan view. However, the planar shape of the detection hole is not limited to the embodiment. The planar shapes of the detection holes in the first to seventeenth embodiment can be employed.

In this way, the wall surface 188*c* of the light-emitting side of the detection hole 188 is provided as a slanted surface that slants toward the light-receiving side. Accordingly, as illustrated in FIG. 22, with the structure in which the detection hole 188 is provided over the original detection sensor 6, light emitted from the light-emitting unit 6*a* of the original detection sensor 6 can be efficiently irradiated on an original side (on an original) and light reflected by the original can be received by the light-receiving unit 6*b*. In addition, the detection hole 188 including the light-emitting side portion 188*a* and the light-receiving side portion 188*b* whose planar shapes are different from each other, and the light-shielding portion 5 having a slanted surface facing the light-receiving unit 6*b* is provided so as to overhang and cover the light-receiving unit 6*b*. This structure can prevent the light-receiving unit 6*b* from receiving disturbance light other than sensor light reflected by the original bundle P and effectively prevent original detection error due to disturbance light.

Figure 23A:
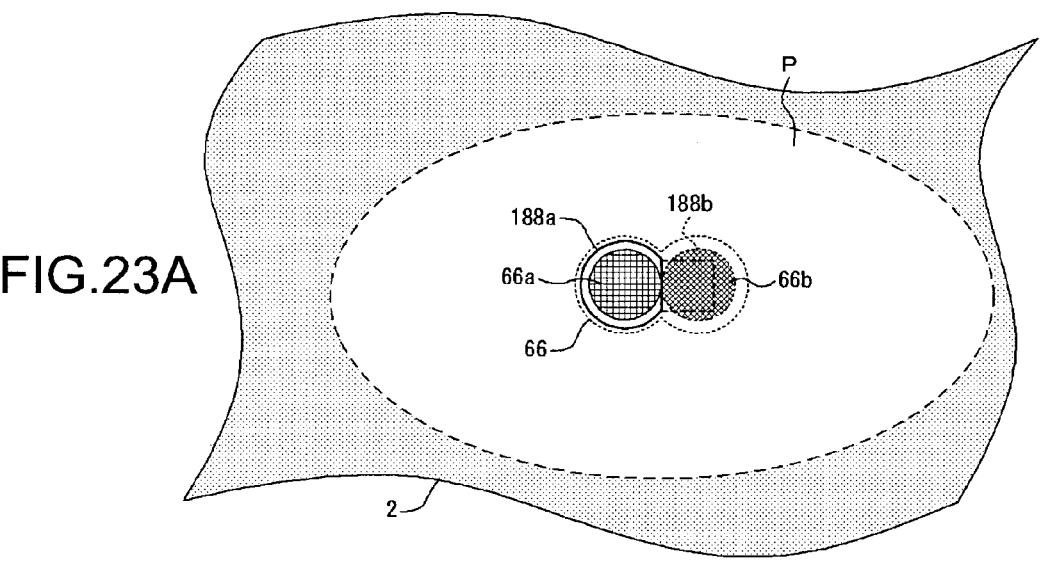
FIGS. 23A and 23B are schematics illustrating a nineteenth embodiment of a disturbance light prevention structure for an original detection sensor.
Figure 23B:
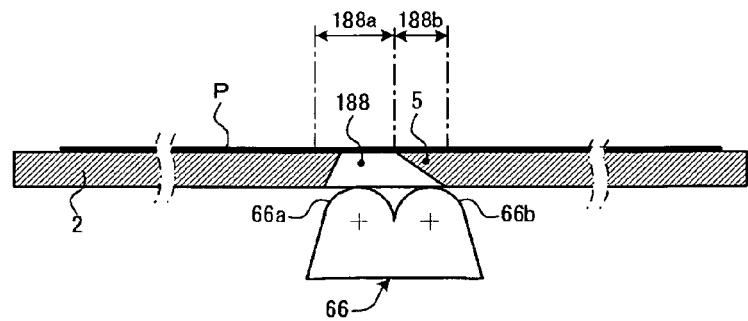

FIGS. 23A and 23B are schematics illustrating a nineteenth embodiment of a disturbance light prevention structure for the original detection sensor 6 disposed under the original table 2. The nineteenth embodiment has basically the same structure of the first embodiment illustrated in FIGS. 3A and 3B. The duplicated description is thus omitted and a difference is described below.

As illustrated in FIGS. 23A and 23B, the detection hole 188 is the same as the detection hole 188 of the eighteenth embodiment illustrated in FIGS. 22A and 22B. A wall surface of the light-emitting side of the detection hole 188 is a slanted surface that slants toward the light-receiving side. The detection hole is not limited to the embodiment. The detection holes of the first to seventeenth embodiments can be employed. The light-shielding portion 5 is provided above the light-receiving side portion 188*b* in the same manner as the first embodiment.

In addition, as illustrated in FIG. 23B, an original detection sensor 66 including a light-emitting unit 66*a* and a light-receiving unit 66*b* is formed to have slanted surfaces as side surfaces thereof. With this structure, light emitted from the light-emitting unit 66*a* having a slanted surface can be efficiently irradiated on the original side (an original) and light reflected by the original can be efficiently received by the light-receiving unit 66*b* having a slanted surface.

The shape thus formed of the original detection sensor 66 enables light emitted from the light-emitting unit 66*a* to be efficiently irradiated on the original side and light reflected by an original to be efficiently received by the light-receiving unit 66*b*. In addition, the detection hole 188 having the light-emitting side portion 188*a* and the light-receiving side portion 188*b* whose planar shapes are different from each other, and the light-shielding portion 5 having a slanted surface facing the light-receiving unit 66*b* is provided so as to overhang and cover the light-receiving portion 66*b*. This structure can prevent the light-receiving portion 66*b* from receiving disturbance light other than sensor light reflected by the original bundle P and effectively prevent original detection error due to disturbance light.

The present invention is not limited to the embodiments described above with reference to the accompanying drawings. For example, the planar shape of the detection hole through which light emitted from the original detection sensor passes is not limited to the shapes of the above-described embodiments. The shapes can be properly changed and modified. In addition, the original detection sensor 66 of the eighteenth embodiment can be used also as the original detection sensor in each of the embodiments. While the light-shielding portion 5 is formed as an integral part of the original table 2 in the embodiments, a light-shielding portion can be provided as an individual element (a different member) that is not an integral part of the original table.

Furthermore, the automatic document feeder of the present invention is not limited to be applied to a sheet-through method, and can be applied to a device that employs a method in which an original stopped on a contact glass surface is scanned by a running scanning unit (called as an original stop method).

The present invention is not limited to be applied to electrophotography image forming apparatuses, and can be applied to image forming apparatuses employing any image forming method such as an inkjet method. The applicable image forming apparatuses are not limited to full-color image forming apparatuses. Multi-color image forming apparatuses that process multi-colors and monochrome image forming apparatuses are applicable, for example.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An automatic document feeder, comprising:
    an original feed table that has a detection hole and is configured to receive a plurality of originals; and
    an original detection sensor that detects the original on the original feed table, wherein
    the original detection sensor is a reflective optical sensor having a light-emitting unit and a light-receiving unit, and disposed under or inside of the original feed table so as to detect the original though the detection hole, wherein
    a portion of the detection hole is a light-emitting side portion corresponding to the light-emitting unit of the original detection sensor and a portion of the detection hole is a light-receiving side portion corresponding to the light-receiving unit of the original detection sensor, the light-emitting side portion and the light-receiving side portion having planar shapes different from each other, and
    the original feed table includes a light-shielding portion that is provided above the light-receiving unit of the original detection sensor, and has a slanted surface overhanging the light-receiving unit, wherein an area of the planar shape of the light-receiving side portion is smaller than an area of the planar shape of the light-emitting side portion.

2. The automatic document feeder according to claim 1, wherein the planar shape of the light-emitting side portion is a roughly circular shape while the planar shape of the light-receiving side portion is a triangle.

3. The automatic document feeder according to claim 1, wherein the planar shape of the light-emitting side portion is a roughly circular shape while the planar shape of the light-receiving side portion is a wedge shape having a tip facing a light-receiving side.

4. The automatic document feeder according to claim 1, wherein the planar shape of the light-emitting side portion is a roughly circular shape while the planar shape of the light-receiving side portion is a square.

5. The automatic document feeder according to claim 1, wherein the planar shape of the light-emitting side portion is a roughly circular shape while the planar shape of the light-receiving side portion is a rectangle elongated in an original feed direction.

6. The automatic document feeder according to claim 1, wherein the planar shape of the light-emitting side portion is a square while the planar shape of the light-receiving side portion is a roughly circular shape.

7. The automatic document feeder according to claim 1, wherein the planar shape of the light-emitting side portion is a rectangle elongated in an original feed direction while the planar shape of the light-receiving side portion is a roughly circular shape.

8. The automatic document feeder according to claim 1, wherein the planar shape of the light-emitting side portion is a square while the planar shape of the light-receiving side portion is a triangle.

9. The automatic document feeder according to claim 1, wherein the planar shape of the light-emitting side portion is a square while the planar shape of the light-receiving side portion is a wedge shape having a tip facing a light-receiving side.

10. The automatic document feeder according to claim 1, wherein each of the planar shapes of the light-emitting side portion and the light-receiving side portion is a square, and an area of the planar shape of the light-receiving side portion is smaller than an area of the planar shape of the light-emitting side portion.

11. The automatic document feeder according to claim 1, wherein the planar shape of the light-emitting side portion is a square while the planar shape of the light-receiving side portion is a rectangle elongated in an original feed direction.

12. The automatic document feeder according to claim 1, wherein the planar shape of the light-emitting side portion is a rectangle elongated in an original feed direction while the planar shape of the light-receiving side portion is a triangle.

13. The automatic document feeder according to claim 1, wherein the planar shape of the light-emitting side portion is a rectangle elongated in an original feed direction while the planar shape of the light-receiving side portion is a wedge shape having a tip facing a light-receiving side.

14. The automatic document feeder according to claim 1, wherein the planar shape of the light-emitting side portion is a rectangle elongated in an original feed direction while the planar shape of the light-receiving side portion is a square.

15. The automatic document feeder according to claim 1, wherein each of the planar shapes of the light-emitting side portion and the light-receiving side portion is a rectangle elongated in an original feed direction, and an area of the planar shape of the light-receiving side portion is smaller than an area of the planar shape of the light-emitting side portion.

16. The automatic document feeder according to claim 1, wherein each of the planar shapes of the light-emitting side portion and the light-receiving side portion is a roughly circular shape, and an area of the planar shape of the light-receiving side portion is smaller than an area of the planar shape of the light-emitting side portion.

17. The automatic document feeder according to claim 1, wherein an end wall surface of the light-emitting side portion is provided as a slanted surface slanting toward the light-receiving side.

18. The automatic document feeder according to claim 1, wherein the light-emitting portion and the light-receiving portion of the original detection sensor are formed to each have a slanted surface as a side surface thereof.

19. An image forming apparatus, comprising the automatic document feeder according to claim 1.

* * * * *